LOW LOSS SIGNAL DETECTOR CIRCUIT FOR TELEPHONE SYSTEM

Filed March 14, 1966

INVENTOR
CARL GUNNAR SVALA

BY Brown, Jackson, Boettcher & Dienner
ATTORNEY

INVENTOR
CARL GUNNAR SVALA

BY Brown Jackson Boettcher & Dienner
ATTORNEY

United States Patent Office
3,448,221
Patented June 3, 1969

3,448,221
LOW LOSS SIGNAL DETECTOR CIRCUIT FOR TELEPHONE SYSTEM

Carl Gunnar Svala, Galion, Ohio, assignor, by mesne assignments, to New North Electric Company, Galion, Ohio, a corporation of Ohio Filed Mar. 14, 1966, Ser. No. 533,879
Int. Cl. H04m 3/00
U.S. Cl. 179—18 13 Claims

ABSTRACT OF THE DISCLOSURE

A PBX restrictor circuit comprising a low-loss current sensing control circuit for actuating the restrictor apparatus. The low-loss service demand detector circuit consists of a four arm bridge circuit connected to the two lines of a trunk circuit. The bridge circuit has a transistor switch in each of two of the arms connecting the two trunk lines together, one of which transistor switches is sensitive to the current flow in its respective line under one polarity condition of the trunk and the other of which is sensitive to the current flow in its respective line under the other polarity condition of the trunk so as to cause a balanced or unbalanced condition in the bridge circuit which is detected and amplified by a differential amplifier. The amplifier output is utilized to provide control signals for the restrictor apparatus.

Figure 1:
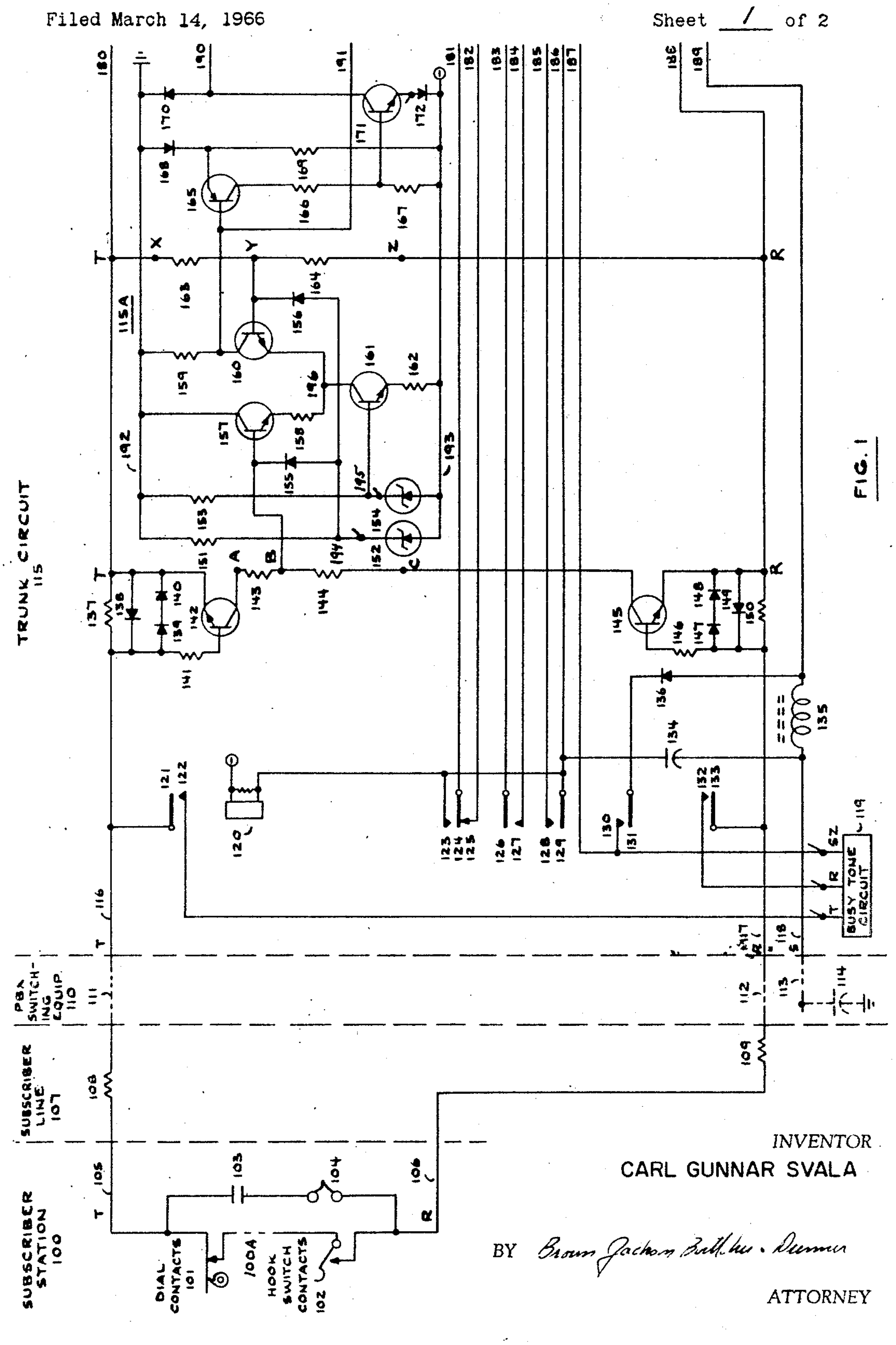

This invention relates in general to detector circuits, and more specifically to detector circuits connected to telephone lines for detecting on-hook, off-hook and dial pulse signals.

The present invention has particular application in its use in PBX restrictor arrangements, although it should not be considered as limited to such. As is known in the art, a conventional PBX telephone system is normally connected to provide service between local stations served by the PBX. Additionally, by dialing a preliminary digit in the PBX, a local station can reach a group of trunks which will extend the connection from the PBX station to desired stations in an associated city exchange, as well as to desired stations which are reached over free service trunks in the city exchange. If the city exchange has direct distance dialing facilities, any calls from the stations in the PBX made via these direct distance dialing facilities will be billed to the PBX by automatic toll ticketing means associated with the city exchange. However, there will be no identification of the calling station which made the call. Accordingly, in certain PBX systems arrangements are provided to restrict certain calls of selected stations, and a station so restricted is referred to as a "restricted station."

In calls made from a restricted station certain of the digits dialed are automatically examined by restrictor equipment in the PBX system, and the call is allowed or not allowed to proceed through the city exchange. Disallowed calls receive busy tone, a recorded message, or are routed to an intercept operator. Examples of systems operative in this manner are disclosed in U.S. Patents 2,871,301, 2,875,286, and 3,201,523.

In the system disclosed in U.S. Patent 3,201,523, calls from the PBX to the associated city exchange are extended via a trunk circuit which includes a straight-through, metallic-line path with a low loss, fast-acting voltage detection "pick-off" circuit connected to the tip conductor. The "pick-off" circuit as there disclosed detects on-hook, off-hook, and dial pulse signals for call screening purposes at the PBX, whereby a signal of any type may be transmitted directly between the PBX and the city exchange without the need for blocking capacitors and battery feed relays in the trunk and the conventional pulse repeating equipment for extending the pulses to the city exchange. The "pick-off" detection circuit of U.S. Patent 3,201,523 is a voltage detection circuit which follows dial pulses with extreme accuracy in installations having: (a) city trunk resistances of several thousand ohms; (b) PBX extension line resistances of up to a thousand ohms; (c) as many as ten bridged ringers on the line; and (d) leakages as low as a few thousand ohms.

Furthermore, novel means were disclosed in U.S. Patent 3,201,523 which guarded against fraudulent endeavors to avoid restrictions by the system, including attempts to defeat the fast-acting signal "pick-off" circuit.

However, it has been found that in systems in which the resistance in the tip side of the line toward the city exchange is practically zero, the "pick-off" voltage detection means of such disclosure was inadequate. In an attempt to provide an operative arrangement in such systems, resistance in the order of several hundred ohms was artificially inserted in the tip side of the city trunks. However, the resultant attenuation of the signals was undesirable. Furthermore, the lower the resistance of the city trunk, the lower the resistance the PBX loop had to be to enable the "pick-off" circuit to function properly.

Accordingly, a need developed for a new low loss "pick-off" circuit which was relatively independent of the resistance of the PBX loops and of the city trunk circuits, and it is an object of the present invention to provide such a circuit. There is a further need for a "pick-off" circuit which can operate reliably in systems in which a considerable difference in the ground potential exists between the PBX and city exchange, and which can function properly with polarity reversal of the city trunk by the city exchange.

According to another object of the invention, a low loss "pick-off" circuit is provided which functions upon a combined current sensing and voltage sensing principle to solve these problems.

Figure 2:
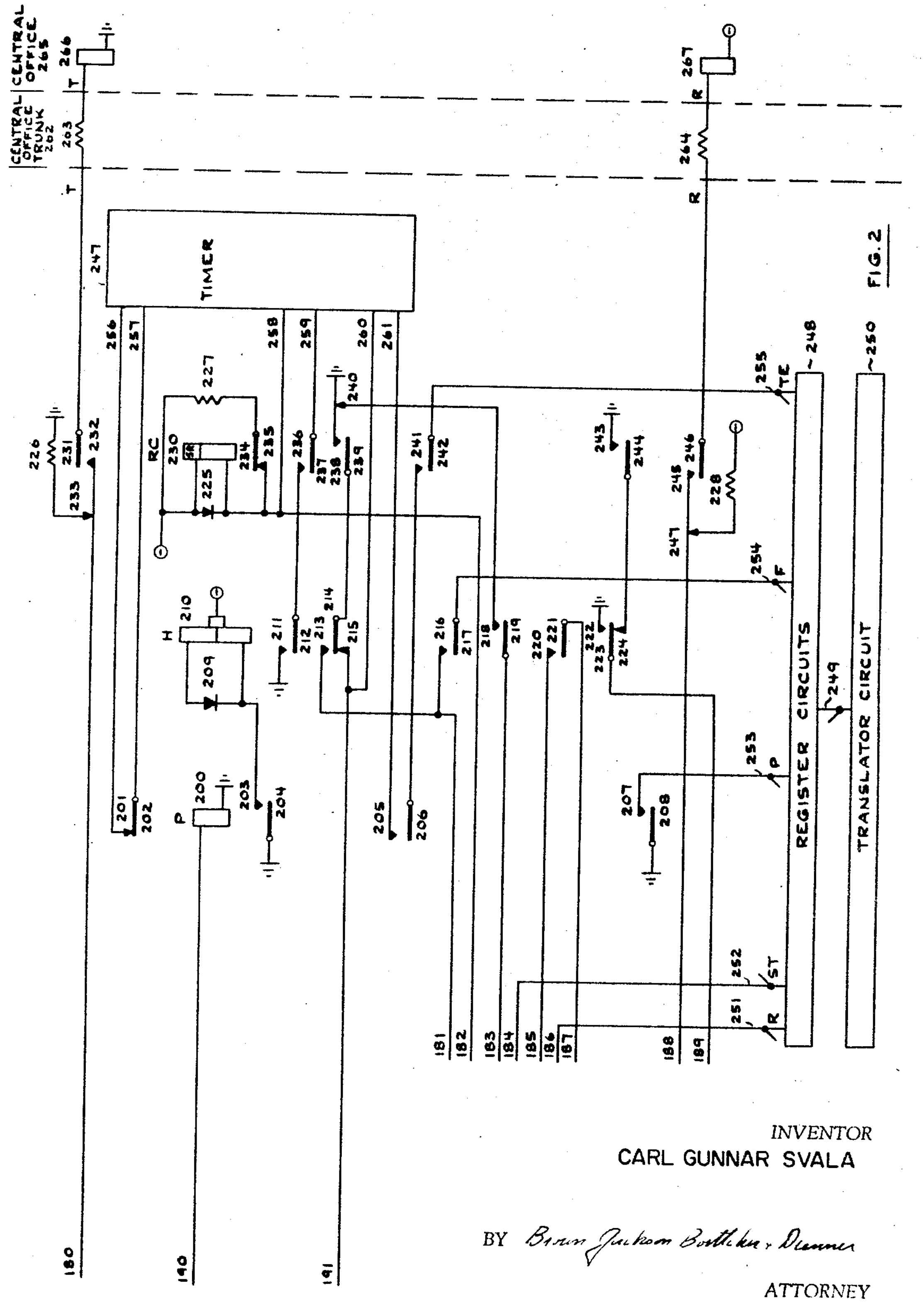

These and other objects, advantages and features of the invention will be apparent to those skilled in the art from the following detailed description, taken in conjunction with the accompanying drawings, in which:

FIGURES 1 and 2, which are combined, illustrate a telephone system embodying the novel pick-off circuit of the invention.

GENERAL DESCRIPTION

With reference to FIGURES 1 and 2, there is shown subscriber station 100, subscriber line 107, PBX switching equipment 110, trunk circuit 115, central office trunk 262, and central office 265.

Within the substation 100 will be found dial contacts 101, hook switch contacts 102, and other elements indicated by dotted portion 100A connected in series with the subscriber line 107, and a high impedance ringer 104 connected in series with a condenser 103 across the dial contacts 101 and hook switch contacts 102. The resistance of the two sides of the subscriber line 107 is illustrated by means of resistances shown as 108 and 109. In the off-hook condition prior to and after dialing certain interval resistance from about 50 ohms to several hundred ohms of the substation included in the dotted line portion 100A is included in the series substation loop. During dialing, this resistance may be shunted out.

The PBX switching equipment 110 is illustrated as having switching contacts, schematically illustrated by broken lines 111, 112, and 113, by means of which access is had to a plurality of trunk circuits, such as illustrated trunk circuit 115. In conventional systems, the trunk circuits are reached over a selector level in the PBX by dialing a single digit, such as, for example, digit "9."

The trunk circuit 115 of FIGURES 1 and 2 is shown as embodying the low loss "pick-off" circuit of the invention designated 115A which includes a high shunt-impedance bridge circuit, to be described, connected between the tip and ring conductors T and R of the trunk by means of transistors 142, 145 in two of the bridge arms, low series impedance elements 137, 150 in the tip and ring conductors, and a detector D to detect the balanced or unbalanced condition of the bridge. The bridge is balanced by the switching of transistor 145 as a result of the sensing of current flow in the calling loop, or by the switched condition of transistor 142 instead of 145 upon line reversal at the central office.

Trunk circuit 115 also includes a set of relays 200, 210, 230 (FIGURE 2) which provides pulse and control functions in a manner to be described. The trunk circuit 115 has access to a common busy tone circuit 119 (FIGURE 1) which as shown, is multipled to a plurality of trunks, such as illustrated trunk 115. Trunk circuit 115 also has access to a group of register circuits, such as illustrated register circuit 248 (FIGURE 2). Each register circuit has an associated trunk-finder (not shown). A common start lead 252 for the group of registers, including register 248, is shown as being multipled to all trunks, such as 115. The start lead 252 passes serially through allotter relay contacts in each register to provide an allotter circuit for selectively starting the trunk-finders. The allotter relays are reset by allotter reset means, not shown. Such circuitry is known in the art and is not believed to be necessary to a showing of the invention.

Register circuit 248 has access over path 249, which comprises a plurality of leads, to translator circuit 250. Also, as illustrated by the multiple sign on path 249, the other registers of the group including register circuit 248 have access to the translator circuit 250. A guard circuit within the register circuits, such as 248, permits one register at a time to gain access to the translator circuit.

In a system including restrictor equipment, the subscriber stations connected to the PBX may include a first group of stations which are non-restricted, and a second group of stations which are restricted. Each non-restricted station has a condenser 114 connected via a lead, such as 113, between its S-wire, such as 118, and ground (see broken lines in FIGURE 1). Thus when the register circuit, such as 248, makes a tone test, the tone path continuity, by means of the condenser 114, apprises the register that a non-restricted station is making a call and such station will not be restricted in any way. If a station is not connected via a condenser 114 to ground, the lack of continuity of the tone path apprises the register 248 that a restricted station is making a call, and the register 248 via the translator 250 examines the dialed digits to determine whether the call should or should not be restricted.

The circuitry is arranged to disallow calls, in which case restriction relay 120 becomes operated. If strapping is equipped in the translator to allow the call as a result of the combination of digits dialed, restriction relay 120 does not become operated. The manner in which such relay is controlled will be described in more detail hereinafter.

In making a call, the calling subscriber dials a first digit, such as "9," which effects selection over selector level "9" of a trunk circuit, such as 115. In normal calls, the calling subscriber dials a called number comprising a three digit office code followed by a four digit station number. The three digit office code passes over the central office loop, as will be shown, to the central office 265, and the "pick-off" circuit 115A (FIGURE 1) also relays these digits to a register, such as 248, which, by consulting the translator circuit 250, determines whether or not the call should be restricted. If the call is not restricted, the four digit station number passes over the central office loop, enabling the central office 265 to complete the connection to the called station. If the call is to be restricted, the connection to the central office 265 is released, and a busy tone from circuit 119 is connected to the calling station by restriction relay 120. Certain other codes from one to four digits may be examined by means of the register 248 and translator 250, and restriction or allowance will be effected in accordance with the mode preselected.

*Pick-off circuit 115A*

With reference to the "pick-off" circuit 115A the high-impedance bridge connected across the trunk includes four arms BT, BR, YT, YR, between points B and Y and the Tip and Ring including the principal resistors, each having a value of 68K connected, in the arms as follows:

| Arms: | Resistor |
|---|---|
| 1st BT | 143 |
| 2nd BR | 144 |
| 3rd YT | 163 |
| 4th YR | 164 |

The first arm BT includes a transistor switch 142 and the second arm BR includes transistor switch 145. A differential amplifier 157, 160 is connected between bridge points B and Y to provide outputs which differ as the bridge is in the balanced or unbalanced condition. Transistor 161 provides a constant current source for the differential amplifier, and transistors 165, 171 operate as a relay driver circuit connected between the differential amplifier and pulsing relay 200.

Briefly, in the idle condition of the trunk, the first arm BT is connected to the tip side T of the trunk through the forward biased base-collector junction of NPN transistor 142, the third arm YT is directly connected to the tip side T of the trunk, the fourth arm YR is directly connected to the ring side R of the trunk, but the second arm BR is effectively disconnected from the ring side of the trunk by means of the unbaised transistor 145. In this condition, the bridge is unbalanced and pulsing relay 200 will not be operated.

When the closed line loop is extended to the trunk, means which sense current flow in the calling loop cause transistor 145 to assume the saturated state, connecting the second arm to the ring side of the trunk via its collector-emitter path. As will be shown, the bridge is then balanced, and the pulsing relay 200 will be operated. In order for the bridge to be balanced, the line loop has to be closed, and there has to be sufficient voltage between tip and ring leads to provide a loop current to saturate transistor 145 (or 142 in the reversed polarity case).

When the line loop is opened, the cessation of current flow in the calling loop causes transistor 145 to become cut-off to disconnect the second arm BR from the ring side of the trunk, whereby the bridge is unbalanced, and the pulsing relay 200 is released.

However, with the line loop closed or open, should either or both sides of the trunk leading to the central office 265 become open, the voltage difference between points B and Y will remain within limits to keep relay 200 operated. That is, the circuit, and especially the differential amplifier, is so arranged that it will still keep the relay 200 operated when the polarities on tip or ring or both are missing, regardless of the line loop condition. One might say that relay 200 is operated as long as there is no appreciable unbalance voltage between points B and Y, i.e., not more than 6.8 volts. Obviously, there will be no such unbalance voltage when the feed voltage to the bridge is missing due to an open tip or ring conductor (or both) even if the bridge is basically unbalanced due to lack of line current.

The circuits connected to the line are symmetrical and permit line reversal from the central office. If the central office reverses the polarity of the trunk conductors, transistors 142 and 145 simply exchange roles relative to the bridge circuit.

The "pick-off" circuit is practically independent of PBX station and central office loop resistances and will operate with loop ranges as follows: PBX loop of 0–1200 ohms, or combined PBX and central office loops in any combination from 0–1500 ohms.

The sensitivity of transistor 145 is determined by resistor 150. Although minimum line current is 15 ma., transistor 145 is designed to turn on at 10 ma. because of the inductive feed from the central office. This decreases dial pulse distortion and maintains the required 40/60 dial pulse ratio. Transistor 145 also determines the sensitivity of the circuit to line leakage. This leakage would have to be 5K, or less, on the subscriber loop to give a false output.

Peak base current of transistor 145 occurs with minimum subscriber loop resistance and maximum line capacitance to ground on the central office loop. Resistor 146 and diodes 147 and 148 limit this current. Diode 138 provides a low impedance transmission path and protects the transistor 142 from excessive base-emitter back voltage.

DESCRIPTION OF BRIDGE CIRCUIT

As noted above, a differential amplifier is connected between the four bridge arms to provide indications of the unbalance as detected by the bridge. The differential amplifier as shown comprises transistors 157 and 160, the base of transistor 157 being connected to point B between resistors 143 and 144 in the first and second arms; and the base of transistor 160 connected to point Y between resistors 163 and 164 in the third and fourth arms.

A constant current source comprising transistor 161 and related circuitry provides a maximum current of 1 ma. to the emitter-base path of NPN transistor 157 through 6.8K resistor 158, and to the emitter base path of transistor 160 directly. Transistor 157 has its collector connected directly to ground. Transistor 160 has its collector connected to ground via 3.9K resistor 159.

The collector of transistor 160 controls transistor 165 which in turn controls transistor 171 which in turn controls the operation and release of pulsing relay 200.

An eleven volt Zener diode 152 connected in series with 22K resistor 151 between the PBX negative battery and ground provides a point 194 of constant potential which is 11 volts toward ground from negative battery (i.e., if the battery is −50 volts, this point 194 will be −39 volts). Diodes 155 and 156 connected to point 194 provide a means for clamping the bases of transistors 157 and 160 to the clamping potential under certain circumstances, as described more fully hereinafter. Diodes 155 and 156 also protect transistors 157 and 160 from transient spikes. Diode 152 as shown is multipled to other trunk circuits, one diode being provided for every fifty trunks.

The 6.2 volt Zener diode 154 connected in series with 6.8K resistor 153 provides a point 195 of constant potential 6.2 volts toward ground from PBX negative battery (i.e., if the battery is −50 volts, this point will be 43.8 volts), which establishes a base bias for transistor 161, the emitter of transistor 161 being connected via 5.6K resistor 162 to the negative battery lead. Again, one diode 154 is provided for every fifty trunks.

With points B and Y at the same potential at balanced bridge, essentially all of the current from transistor 161 will flow through transistor 160 (due to the 6.8K resistor 158 in the emitter circuit of transistor 157), causing transistor 160 to drive transistor 165 which drives transistor 171 in turn operating relay 200.

If the potential of point B rises and becomes at least 6.8 volts more positive than the potential of point Y, transistor 160 becomes cut-off, resulting in the release of relay 200. Essentially all the current from transistor 161 then passes through transistor 157. This 6.8 volt difference provided by 6.8K resistor 158 establishes a 6.8 differential threshold voltage which minimizes the effects of temperature and component variation.

The constant current source 161 also enables the differential amplifier to be immune to variations in ground potentials between the PBX and the central office as well as to rather wide fluctuations in battery voltages at the PBX and central office. It also is instrumental in maintaining relay 200 operated should the ring lead lose its feed potential. The manner in which the novel circuitry and particularly the "pick-off" circuit are operative for different conditions of the line loops are now set forth.

OPERATION OF PICK-OFF CIRCUIT FOR DIFFERENT CONDITIONS OF CALLING LOOP

*Calling loop closed—Balanced bridge*

With the calling loop closed, points A and X will be connected to a potential closer to ground than points C and Z which will be connected to a potential closer to negative battery resulting in a balanced bridge. At the PBX and at the city exchange, battery voltage may vary between 44 v. and 56 v. For our discussion, we shall assume negative battery voltage to be 50 v. in which case with balanced feed coils 266 and 267 at the central office, points B and Y will be at approximately −25 v. If the tip goes directly to ground at the central office, points B and Y will be at some potential more positive than −25 volts. In these conditions diodes 155 and 156 will be back-biased. Essentially all of the current from transistor 161 will flow through transistor 160, and via transistor 165 and power transistor 171 will effect operation of relay 200. Diodes 168 and 172 provide a slight voltage drop in the emitter-base paths of transistors 165 and 171 respectively which must be overcome to cause the transistors to conduct, thus rendering the circuit more stable.

*Calling loop open—Unbalanced bridge*

With the calling loop open, points A and X will be connected to a potential close to ground, point Z will be connected to a potential close to negative battery, and point C will be essentially disconnected. Accordingly, point B will rise toward ground potential whereby all the 1 ma of current from transistor 161 will flow through transistor 157. Accordingly, the collector potential of transistor 160 will rise to essentially ground, switching transistor 165 off which in turn switches power transistor 171 off to release relay 200.

*Calling loop closed—With tip side of line becoming open*

With the calling loop closed, if ground is disconnected from the tip conductor (as for example, due to a momentary opening of the tip side of the line during switching at the central office) loop current ceases flowing, whereby transistor 145 becomes cut-off. Also, the potential of point Y will move from −25 volts in the direction of negative battery. When point Y drops to −39 volts and tries to become more negative, diode 156 becomes forward biased and current flows over the path from point 194 (−39 v.), diode 156, point Y, resistor 164, and point Z to conductor 188 and a smaller amount over the base-emitter path of transistor 160, point 196 to the collector of transistor 161 which is at least as negative as −44 volts, thus clamping point Y at −39 volts. With point Y at −39 v., transistors 160, 165 and 171 conduct to hold relay 200 operated. As points A and C in effect become open, point B will be clamped to −39 volts due to curren flow from point 194 over diode 155, the base-emitter path of transistor 157, resistor 158, to point 196, very little current flowing through resistor 158.

*Calling loop closed—With ring side of line becoming open*

We shall assume that the calling loop is closed, and that the ring side of the line becomes open so that negative potential is disconnected therefrom. In such event, points A, C, X, and Z are close to ground potential. That is, point X is directly connected to the tip, Z is essentially connected to the tip conductor through the calling loop, A is connected to the tip conductor through the forward base-collector path of transistor 142, and C is essentially connected to the tip conductor through the forward biased base collector path of transistor 145 and the calling loop. Thus, two parallel circuits can be considered as extending from the tip conductor to point Y; one being through 68K resistor 163; and the other being through 68K resistor 164. Essentially therefore, a single 34K circuit exists from the tip conductor to point Y. By similar reasoning, essentially a 34K circuit exists from the tip to point B. Diodes 156 and 155 are thus back-biased. A circuit can be traced from point Y through the base-emitter circuit of transistor 160 to point 196. From point B, a circuit can be traced through the base-emitter circuit of transistor 157 and 6.8K resistor 158 to point 196. Thus, essentially symmetrical circuits exist except for the resistor 158.

If transistor 160 were cut-off, point Y would be very close to tip potential which is very close to ground. If transistor 160 were in saturation, point Y would be at a point in the order of −0.5 volts. This can be appreciated by virtue of the drops in the order of 0.5 volts across each of rectifier 168 and the emitter-base path of 165 to the collector of 160, and considering that in a saturated NPN transistor the base is approximately 0.5 volts more positive than the collector.

It should be recalled that point B must be 6.8 volts more positive than point Y to cut-off transistor 160.

As most positive potential point B could assume is ground, it cannot become sufficiently positive to create a 6.8 volt difference between points B and Y to cut-off transistor 160, and accordingly transistor 160 continues conducting in turn keeping transistors 165 and 171 conducting and relay 200 operated.

*Calling loop closed—With tip and ring sides of line becoming open*

With the calling loop closed, if the tip and ring sides of the line becoming open, disconnecting ground and negative potential therefrom (as for example during a switching operation at the central office) points A and C essentially become disconnected from the tip and ring conductors. Point 194 being at essentially −39 volts, the base of transistor 157 becomes clamped to about −39 volts with current flowing over the path extending from ground, resistor 151, point 194, rectifier 155, base-emitter path of transistor 157, resistor 158, point 196, the collector-emitter path of transistor 161 and resistor 162 to negative battery. The base of transistor 160 also becomes clamped to −39 volts with current flowing over the path extending from ground, resistor 151, point 194, rectifier 156, base-emitter path of transistor 160, point 196, collector-emitter path of transistor 161 and resistor 162 to negative battery. Thus the bridge remains balanced and essentially all of the 1 ma. of current flows through transistor 160 whereby transistors 165 and 171 maintain relay 200 operated.

SEQUENTIAL OPERATION

*Calling party removes handset and dials "9"*

The manner in which the "pick-off" circuit operates during dialing of the digit "nine" to seize a trunk circuit, such as 115, over a selector level in the PBX switching equipment 110 is now set forth. Normally, ringer 104 and condenser 104, at the subscriber substation 100, present a very high impedance in series with the subscriber line 107. When the calling party removes his handset, hook-switch contacts 102 close, extending a loop involving the internal resistance of the substation and resistances 108 and 109 to PBX switching equipment 110, seizing an available selector in the PBX. Dial tone is returned to the calling party over the connection as the selector is seized.

When the calling party dials the digit "9," for example, the selector is operated in response to the impulses representing the digit to extend the calling line over contacts 111–112–113 to an idle one of the trunks, such as trunk circuit 115. At this time, a circuit can be traced from ground through 1K resistor 226, break contacts 233 of relay 230, lead 180, 47 ohm resistor 137 and diode 138 in parallel (diodes 139 and 140 being back-biased), lead 116, contacts 111, resistance 108 of subscriber line, lead 105, dial contacts 101, other elements 100A, hook-switch contacts 102, lead 106, resistance 109 of subscriber line, contacts 112, lead 117, three parallel paths comprising (a) 47 ohm resistor 150, (b) the emitter-base path of NPN transistor 145, and (c) diodes 147 and 148 (diode 149 being back-biased); lead 188, break contacts 247 of relay 230, 1K resistor 228, to negative battery.

In this circuit, the sensitivity of transistor 145 is determined by the value of resistor 150 which is chosen to be 47 ohms so that with a minimum of 10 ma. of loop current flowing through resistor 150, there will be almost ½ volt thereacross and, accordingly, across the series combination of 10 ohm resistor 146 and the base-emitter path of transistor 145. The drop across resistor 146, which is a current limiting resistor, is negligible, and the voltage across the base-emitter path of transistor 145 effects conduction thereacross. The voltage across diodes 147 and 148 is insufficient to cause conduction thereby.

Also, in this circuit, the voltage across 47 ohm resistor 137 is sufficient to cause diode 138 to conduct which limits the voltage across the base-emitter path of transistor 142.

Thus, points A and X are connected to a potential closer to ground than points C and Z which are connected to a potential closer to negative battery. With balanced feed from the central office, the potential of points B and Y becomes −25 v., balancing the bridge which establishes an operating circuit for relay 200. If the tip side of the line goes directly to ground at the central office, points B and Y will both be at essentially the same potential but somewhat more positive than −25 v., holding relay 200 operated.

As relay 200 operates in response to extension of the connection from the calling subscriber substation to the trunk it is effective at its contacts 201–202 to open the loop via leads 256 and 257 to the timer 247, which operation is not presently pertinent; at its contacts 203–204 establishes a circuit to slow-release relay 210; at its contacts 205–206 prepares a circuit to the timer; and at its contacts 207–208 connects ground to lead 253 which as will be shown extends pulses to the register circuits simultaneously with the dialing thereof by the calling party.

Relay 210 operates and at its contacts 211–212 prepares a circuit for the timer; at its contacts 213–214 prepares a holding circuit for relays 120 and 230; at its contacts 214–215 holds open a circuit to the bridge circuit; at its contacts 216–217 prepares a circuit for relay 230; at its contacts 218–219 closes a start circuit to engage a register; at its contacts 220–221 prepares a holding circuit for relay 120; at its contacts 222–223 prepares one circuit for busy tone start; and at its contacts 223–224 holds open another busy tone start circuit.

The start circuit for engaging a register can be traced from ground, back contacts 240, contacts 218–219, lead 183, 126–127, lead 184, to the common start lead 252 which causes a trunk finder associated with a register circuit, such as illustrated register circuit 248, to search for and find, if available, trunk circuit 115, and to connect leads 251, 253, 254, and 255 from the trunk to the register.

As an indication that a register has been found, the register places ground on lead 254, which ground through contacts 216–217, lead 181, contacts 124–125, lead 182, and the winding of slow release relay 230 to negative battery, energizes relay 230.

Relay 230 operates and at its contacts 231–232, which make before contacts 233–232 break, transfers lead 180 over trunk resistance 263 and the winding of 250 ohm relay 266 in the central office to ground or directly to ground without going through relay 266; at its contacts 234–235 opens the circuit of 1K resistor 227 in shunt therewith; at its contacts 236–237 completes a ground circuit to the timer not pertinent at this time; at its contacts 238–239 which make before contacts 238–240 break provides a holding circuit for itself, independent of the ground on lead 254; at its contacts 240 disconnects ground from the start lead 252; and at its contacts 241–242 completes a circuit from lead 255 to the timer over which no signal passes at this time; at its contacts 243–244 connects ground to the break contacts 224 of relay 210; and at its contacts 245–246, which make before contacts 245–247 break, transfers lead 188 from negative battery in the trunk to a circuit extending over trunk resistance 264 and the winding of 250 ohm relay 267 in the central office to negative battery. Thereupon the calling party receives dial tone over the trunk from the central office in a manner will known in the art.

*Calling party dials three digit office code*

Thereupon the calling party dials the three digit called office code of the called party. As these three digits are dialed, dial contacts 101 open and close to transmit pulses over the trunk to the central office. Transistor 145 follows the pulses, the opening of contacts 101 causing transistor 145 to be cut-off which in turn results in unbalancing of the bridge, as described above, and the closing of contacts 101 causing transistor 145 to conduct to saturation and to effect balancing the bridge. As the bridge is unbalanced, relay 200 restores, and as the bridge is balanced, relay 200 operates.

Relay 200 as thus pulsed, is effective at its contacts 207–208 to relay the dial pulses over conductor 253 to the connected one of the register circuits, such as 248.

When all three digits of the called office code have been registered in the register circuit, the register circuit via a guard circuit becomes connected over path 249 to translator circuit 250 which examines the three digits received by the register circuit to determine whether or not the call should be restricated, such equipment and mode of operation being known in the art.

*Non-restricted call*

If the translator 250 does not find that the call should be restricted, it so signals the register over path 249. The register circuit thereupon extends a ground pulse, over lead 255, contacts 241–242, 206–205, and lead 261 to the timer 247 to begin a time interval during which the calling party must complete the dialing of the called number. On calls from non-restricated calling station, the register having made a tone test over the S-wire, is apprised that the calling station is unrestricted and accordingly withholds the ground pulse from lead 255. The register circuit 248 then releases the associated trunk-finder which disconnects leads 251, 253, 254, and 255 from the register circuit. The four digit station number as dialed by the calling party passes over the trunk to the central office 265. These digits are also detected by trunk 115, and relay 200 operates in response thereto. However, the pulsing effected at its contacts 207, 208 over lead 253 is without effect at this time.

If the calling party for any reason whatsoever attempts to dial another number after the timing period has expired, the break period of the first dialing impulse transmitted effects the release of relay 200 which closes its contacts 201, 202 to complete a loop via leads 256, 257 to timer 247. The timer 247 responsively extends ground over leads 260, 191 to hold transistors 165 cut-off which in turn holds transistor 171 cut-off and relay 200 is released. During the break period, relay 210 holds and at its contacts 211, 212, extends ground over contacts 236, 237 and conductor 259 to provide one holding circuit for the timer; and at its contacts 213, 214 provides another holding circuit for the timer which extends from ground over contacts 238, 239, 213, 214, lead 181, 124, 125, 182, and lead 258 to the timer.

After an interval, relay 210 restores, and at its contacts 213, 214 opens the holding circuits for relay 230 which releases after a further interval. During this further interval ground through contacts 238, 239 and 214, 215 holds transistor 165 cut-off; and ground through contacts 243, 244 and 223, 224 holds the PBX selector until the trunk has released. When relay 230 finally releases, contacts 231, 246 open to release the city trunk and contacts 243, 244 open to remove ground from the PBX selector S-wire to release the selector. The holding circuits for the timer via lead 258, 259 are opened as indicated and the timer removes ground from lead 260 to free the trunk. If the calling party hook switch contacts 102 are still closed (i.e., the calling party has not hung up), the call will re-land in the PBX.

*Answer*

Assuming that the call has proceeded normally, the calling party will be rung in a conventional manner. In certain types of city office equipment, with answer by the called party, the polarity of the trunk is reversed. When this occurs, transistor 142 and point A exchange roles with transistor 145 and point C. As these transistors and their associated circuitry are identical, their effect on the bridge circuit is the same. Also, points X and Y, whose circuits are identical, exchange roles so that their effect on the bridge circuit is the same.

Briefly, in such event, transistor 142 conducts to connect point A to the tip conductor lead 180 via its collector-emitter path. The collector-emitter path of transistor 145 is back-biased, but transistor 145 connects point C to lead 188 over the path extending from point C over the collector-base path of transistor 145 which is forward biased, resistor 146, diode 149 and resistor 150, in parallel, to lead 188.

*Release*

When the calling party replaces his handpiece, the loop is interrupted by hook switch contacts 102, and transistor 142 becomes cut-off (or transistor 145, if the called party has already released so that the trunk polarity has changed back), resulting in the release in turn of relays 200, 210, 230 in sequence.

*Restricted call*

If the translator 250 finds that the call should be restricted, it so signals the register circuit 248 over path 249 and the register circuit sends a ground pulse over lead 251 (but not over lead 255) to operate restriction relay 120.

Relay 120 at its contacts 123, 124 locks to ground over lead 181, contacts 213, 214, and contacts 238, 239; at its contacts 130, 131 closes a circuit for busy tone circuit 119 which extends from ground over contacts 222, 223, lead 189, rectifier 136, contacts 130, 131 to the common operate lead SZ to operate the busy tone circuit. The ground is also extended over lead 187, contacts 220, 221, lead 185, contacts 128, 129 to the restrictor relay 120 as another locking ground. Relay 120 at its contacts 126, 127 holds the register start lead 252 open; at its contacts 121, 122 and 132, 133 extends busy tone from busy tone circuit 119 to the calling party; and at its contacts 124, 125 opens the circuit of slow release relay 230.

After an interval determined by its slow release characteristics, relay 230 releases. Relay 230 at its contacts

231, 232, 233 and 245, 246, 247, releases the city trunk circuit, and transfers the tip and ring of the local PBX trunk circuit through resistors 26 and 228 to ground and negative battery respectively; at its contacts 236, 237 opens a circuit to the timer which is incidental at this time; at its contacts 238, 239 opens one holding circuit of relay 120; at its contacts 238–240 prepares the register start circuit; at its contacts 241, 242 holds open the lead 255 circuit; at its contacts 243, 244 opens a ground circuit which has no effect at this time..

When the calling party replaces his receiver, the calling loop is opened at contacts 102 and the bridge circuit becomes unbalanced as described above to release relay 200 which opens the circuit of slow release relay 210.

After an interval determined by its slow release characteristics, relay 210 releases. Relay 210 at its contacts 222, 223 removes ground from the busy tone operate circuit SZ, and also releases relay 120 which opens its busy tone connections to conductors 116 and 117.

*Guard arrangement*

In an attempt to avoid the protective limitations of the timer, there is a possibility that subscribers may "jiggle" the hook switch in an attempt to release the city connection without releasing the PBX trunk, and then initiate another call over the PBX trunk. The manner in which the PBX trunk prevents such undesired operation will now be described.

Equipment release is controlled by release control relay 210 and cut-off relay 230. Circulating current via diode 209 makes relay 210 slow to release. Relay 210 which is just slow enough to hold during dial pulses releases faster than the slow release relay in the city exchange, whereas cut-off relay 230 is considerably slower, its slow release being accomplished by circulating current through diode 225 and also by a copper slug associated therewith. If the subscriber hangs up or jiggles the hookswitch for a time period sufficient to release control relay 210, such relay closes a circuit from ground, through contacts 238, 239 and 214, 215 to the base of transistor 165, cutting off this transistor which thereby prevents reoperation of relays 200 and 210 by the calling station before cut-off relay 230 has sufficient time to release. The circuit of relay 230 is open by reason of the open contacts 213, 214 on restored relay 210. When relay 210 releases, contacts 223–224 close before contacts 222–223 open so that ground through contacts 243, 244, 223, 224, lead 189, choke 135, and lead 118 to the S-wire of the PBX selector holds the selector.

When relay 230 releases, the PBX selector becomes released. If the calling subscriber is still on, he will re-land in a PBX trunk and must start over again.

Without such protection, a subscriber may "jiggle" his hookswitch to effect release of the city trunk circuit and relay 210, and recomplete the circuit for relay 210 before relay 230 releases, whereby the connection may land in a different link in the city office, enabling the dialing of a restricted office. By the arrangements described, a calling party cannot complete an unauthorized call by jiggling the hookswitch to release the city connection without releasing the PBX trunk. With this arrangement, the trunk is not free to accept another call until the PBX selector has been released by relay 230, relay 230 being sufficiently slow to insure that the city exchange connection has been released before another call can be presented to it.

*Further consideration of circuits associated with transistors 142 and 145*

In the closed loop condition with ground on the tip and battery on the ring conductors, a D.C. path extends over rectifier 138 and resistor 137 in parallel on the tip side, and through the base-emitter path of transistor 145 in parallel with resistor 150 on the ring side. Speech currents are superimposed on the D.C. so that they can pass through rectifier 138 and transistor 145. Any transients of one polarity occasioned by electrical disturbance or switching which is the same as the D.C. polarity will pass mainly through rectifier 138, 147 and 148. Any transients of the other polarity in excess of the D.C. voltage will pass mainly through rectifiers 139, 140, and 149.

The analogous situation with closed calling loop and reverse battery at the called end will be understood from such description.

It should be observed that by the use of two series rectifiers across the base-emitter path of transistor 145 (transistor 142 is the reverse battery situation) and poled in the forward direction of the base-emitter path, sufficient current is permitted to flow in the base-emitter path of the transistor to saturate the transisor. Additionally such diodes provide transient protection.

While only particular embodiments of the invention have been described and illustrated, it is apparent that modifications and alterations may be made therein. Accordingly, it is the invention in the appended claims to cover all such modifications and alterations as may fall within the true spirit and scope of the invention.

What is claimed is:

1. In an automatic telephone system having a transmission path including first and second conductors for transmitting speech signals and direct current signals including pulses thereover, means connecting a first potential to said first conductor and a second different potential to said second conductor, loop control means for controlling opening and closing of a loop across said conductors whereby direct current flows in a series circuit including said loop and conductors upon closure of said loop and ceases to flow in said series circuit upon opening of said loop, low loss detection means, operative responsive to said first potential and said second different potential on said conductors, including low impedance means in said series circuit for detecting the presence and absence of current flow therein and also including a high impedance bridge circuit, bridge circuit connecting means for connecting said bridge circuit between said conductors, means in said bridge circuit connecting means controlled by said low impedance means to balance said bridge upon closure of said loop and unbalance said bridge upon opening of said loop, and output means connected to said bridge circuit for providing a first output signal responsive to balance of said bridge and a second output signal responsive to unbalance of said bridge.

2. An automatic telephone system as set forth in claim 1 in which said output means includes means for providing said first output signal responsive to loss of said potential on said first conductor or both of said conductors independent of the condition of said loop.

3. An automatic telephone system as set forth in claim 1 in which said output means is operative to provide said first output signal responsive to loss of said potential on said second conductor.

4. An automatic telephone system as set forth in claim 1 including a PBX office having a trunk circuit and restrictor equipment, and in which said transmission path comprises a trunk path in said PBX office, and said output means are connected to repeat said pulse indications to said restrictor equipment, and means controlled by said restrictor equipment to selectively prevent the extension of certain calls over said trunk circuit to further equipment.

5. In an automatic telephone system, a control circuit for providing different output signals for different predetermined conditions on a first and second conductor having a loop opening and closing switch, each of which conductors is connected to a different potential, a bridge circuit having a first apex and a second apex connected to said first and second conductors respectively, including at least one switching means operable to different conditions with certain changes in current flow on said conductors to connect and disconnect one of the arms of said bridge, sensor means connected in series with one of said conductors, at least, for providing indications of changes in current flow to said switching means, and a signal circuit connected across the third and fourth apices of said bridge circuit responsive to a first condition of said switching means to provide a first output signal, and responsive to a second condition to provide a second output signal.

6. In an automatic telephone system as set forth in claim 5 in which the flow of direct current over said sensor means effects operation of said signal circuits to provide said first output signal, and the loss of said potential on either or both of said conductors also effects operation of said signal circuit to provide said first output signal.

7. In an automatic telephone system as set forth in claim 5 which includes a second switching means for a second one of said bridge arms, and means controlling said second switching means to effect connection and disconnection of a second arm in said bridge circuit with a reversal of potential polarity on said conductors.

8. A control circuit as set forth in claim 5 in which said sensor means comprises a resistor connected in series with said one conductor, and said signal circuit includes a differential amplifier having means for providing different signals to associated equipment responsive to balance and unbalance of said bridge.

9. In an automatic telephone system, a control circuit including a bridge circuit having four arms TB, BR, TY, and YR, each arm having a resistance member connected therein, a differential amplifier circuit connected between two apices B and Y of said bridge circuit, a first transistor connecting arm TB of said bridge to a first potential point, a second transistor connecting arm BR to a second potential point, means connecting arm TY directly to said first potential point, means connecting arm YR directly to said second potential point, means for controlling one of said transistors to operate between cut-off and saturation, and to correspondingly adjust said bridge between an unbalanced and balanced condition, and output means for said differential amplifier circuit operative to provide different output signals with said bridge in balanced and unbalanced conditions.

10. An automatic telephone system as set forth in claim 9 in which said differential amplifier includes a first transistor and a second transistor, and means for providing a constant reference voltage to the base element of both transistors upon the disconnection of said first potential.

11. An automatic telephone system as set forth in claim 9 which includes a loop circuit between said first and second potential points and which includes sensor means for detecting current flow in the loop circuit, and said means for controlling said one transistor includes said sensor means for operating said one transistor between the cut-off and the saturated conditions with predetermined changes in the value of current in said loop.

12. In an automatic telephone system, a first potential connected in a first mode of operation to a first conductor and a second different potential connected in a first mode of operation to a second conductor, said potentials on said conductors being reversed in a second mode of operation, a detector circuit for providing a signal to a control point including at least a first arm connected between said first conductor and said control point, and a second arm connected between said second conductor and said control point, a first transistor in said first arm, a second transistor in said second arm, a first sensor means connected in series with said first conductor path across the base-emitter elements of said first transistor, a second sensor means connected in series with said second conductor path across the base emitter elements of said second transistor; the potential on said conductors in said first mode being effective with said first sensor means to establish a path over the base-collector elements of said first transistor from the first conductor to said control point and with said second sensor means to control said second transistor to operate between cut-off and saturated conditions responsive to changing current flow in said second conductor to thereby provide correspondingly different signals to said control point; the potentials on said conductors in said second mode being effective with said second sensor means to establish a path over the base-collector elements of said second transistor from the second conductor to said control point and with said first sensor means to control said first transistor to operate between cut-off and saturated conditions responsive to changing current flow in said first conductor to thereby provide said correspondingly different signals to said control point.

13. In an automatic telephone system, first and second conductors to which first and second potentials respectively are normally connected, and at other times reversed, means for establishing a loop between said conductors, means for opening and closing said loop, a control circuit including a bridge circuit having a point B connected to said first conductor by a first arm BT including a resistor and a first transistor, and to said second conductor by a second arm BR including a resistor and a second transistor; and a point Y connected to said first conductor by a third arm YT including a resistor and to said second conductor by a fourth arm YR including a resistor; a differential amplifier circuit connected between points B and Y, said control circuit also including a first resistor in series with said first conductor and a second resistor in series with said second conductor, said first transistor having it base-emitter path across said first resistor and normally connecting said first arm TB of said bridge to said first conductor via its forward biased base-collector path, said second transistor having its base-emitter path across said second resistor and normally connecting said second arm BR to said second conductor via its emitter-collector path, the voltage drop across said second resistor causing said second transistor to operate between cut-off and saturation with opening and closing of said loop and correspondingly adjust said bridge between an unbalanced and balanced condition, output means for said differential amplifier circuit operative to provide different output signals with said bridge in unbalanced and balanced conditions respectively; said control circuit functioning upon said potential reversal to cause said second transistor to connect said second arm BR to said second conductor via its forward biased base-collector path and to cause said first transistor to connect said first arm TB to said first conductor via its emitter-collector path and to operate between cut-off and saturation with opening and closing of said loop and correspondingly adjust said bridge between said unbalanced and balanced conditions.

References Cited

UNITED STATES PATENTS

| | | |
|---|---|---|
| 3,014,989 | 12/1961 | Smith. |
| 3,201,523 | 8/1965 | Blashfield. |
| 3,331,926 | 7/1967 | Largey. |

KATHLEEN H. CLAFFY, *Primary Examiner.*

A. H. GESS, *Assistant Examiner.*

U.S. Cl. X.R.

179—27